Patented May 30, 1944

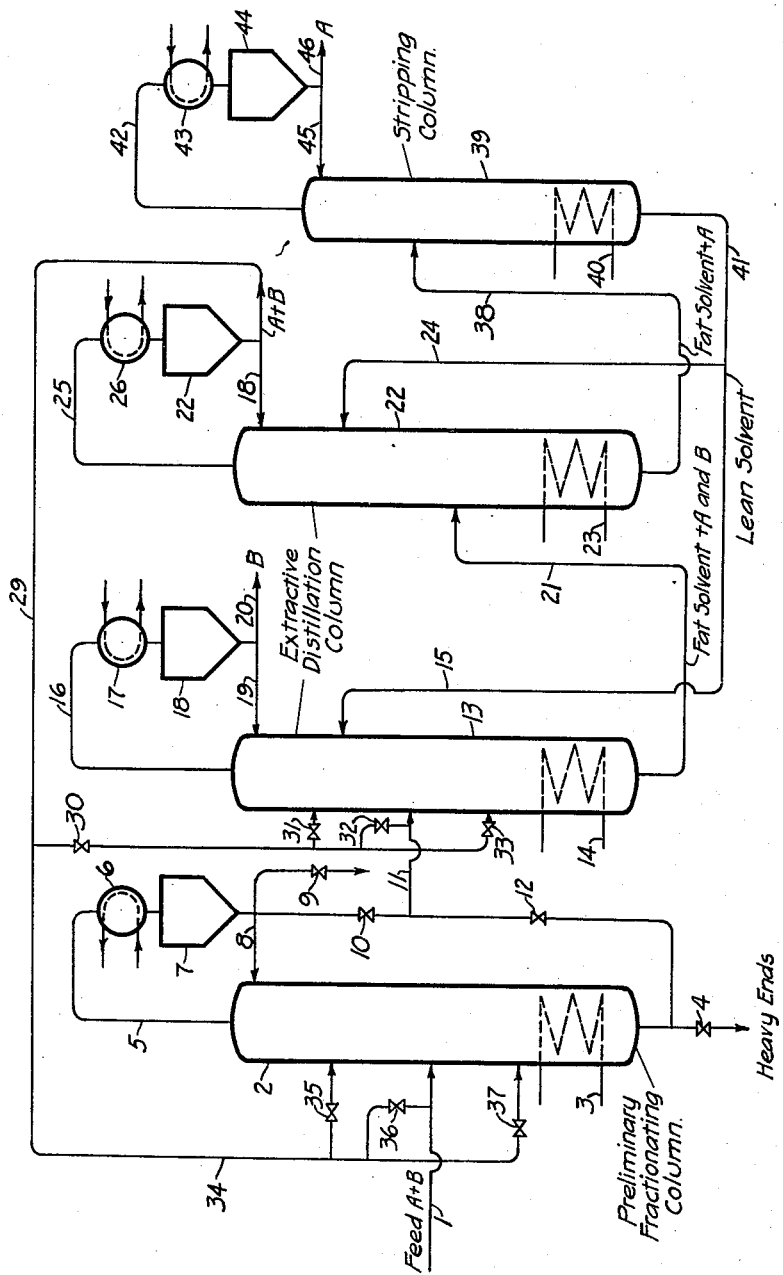

2,350,256

UNITED STATES PATENT OFFICE 2,350,256

EXTRACTIVE DISTILLATION PROCESS

Russell N. Shiras, Oakland, and Mott Souders, Jr., Berkeley, Calif., assignors to Shell Development Company, San Francisco, Calif., a corporation of Delaware Application June 8, 1942, Serial No. 446,312

3 Claims. (Cl. 202—67)

The present invention relates to a process for separating mixtures by distillation. More particularly, it relates to a process for distilling relatively narrow boiling mixtures in the presence of a relatively high boiling selective solvent, which process is hereinafter termed "extractive distillation."

In the past the process of extractive distillation has been successfully employed for the separation of many components of mixtures formerly considered impossible to separate by distillation. It depends upon the alteration of normally existing vapor pressure relationships which exist when substances of different chemical type are distilled in the presence of a relatively high boiling selective solvent.

It has heretofore been customary to carry out such distillations in a single distillation zone in such a manner that, as the relatively more volatile substance passes overhead, the solvent flows down the zone countercurrently contacting and selectively dissolving the more soluble component and exerting its vapor pressure altering effect. Unfortunately, such distillations, while they have great usefulness in actual practice, have the disadvantage of offering very little flexibility of operation; that is, when it is desired to obtain a separation by them it is necessary to very carefully regulate the separation so that just the proper division of overhead and bottom product is obtained. This requirement often necessitates the introduction of expensive control equipment in order to produce products meeting rigid specifications. Another objection is that some products by their very nature prevent clean-cut separation of one component or group of components on the one hand, and the other components or groups of components on the other. For example, this is the case where it is desired to separate complex mixtures which contain constituents differing in type but overlapping in boiling temperatures such as, e. g., petroleum fractions.

It is an object of the present invention to provide an improved extractive distillation process. It is another object to provide an extractive distillation process of greater flexibility than has heretofore been possible. It is still another object to provide a process which permits products to be produced in higher yield and higher purity without requiring complicated control equipment as has heretofore been deemed necessary. Further objects of the present invention will be evident from the following:

The present invention comprises a process for separating a relatively narrow boiling range mixture comprising components or groups of components A and B by extractively distilling said mixture in a first distillation zone in the presence of a relatively high boiling solvent selective for A, A forming the bottom product and B the overhead. This first distillation zone is operated for high recovery of A; that is, in order to prevent loss of A overhead the cut point is adjusted to permit a small part of the more volatile component B to pass off with the solvent and A in the bottom product.

This bottom product is further distilled with the addition of fresh solvent in a second distillation zone, and this second distillation zone is operated for purity of A; that is, the cut point is adjusted so as to prevent contamination of the bottom product with B. To insure this a part of the less volatile component A is permitted to go overhead along with B. This overhead product is then recycled to the first distillation zone or a preliminary distillation zone feeding said first distillation zone, for further separation, and the process thus repeated thereon. By operating in this manner it is possible to withdraw from the bottom of the second distillation zone a product consisting substantially of solvent and A, not contaminated with B. This bottom product is distilled in a separate step to separate component A from the solvent, which bottom product is recycled in appropirate quantities to the two different aforementioned distillation zones.

The present invention may be better understood from a consideration of the flow diagram which represents one embodiment thereof, wherein a mixture comprising components A and B is separated. Component A is of such nature that it has a lower vapor pressure in the presence of a relatively high boiling selective solvent than has B in the presence of said solvent.

A feed mixture comprising components A and B as well as higher or lower boiling constituents is fed via line 1 to preliminary fractionation column 2 equipped with reboiler 3 to enrich the mixture in constituents A and B. If the other constituents present in said mixture are higher boiling than A and B the heat input and reflux ratio are adjusted to take a fraction rich in A and B overhead and withdraw the heavy ends from column 2 via valved line 4, while vapors of A and B pass overhead via line 5 to condenser 6. Condensed vapors collect in accumulator 7, whence a portion is returned to column 2 as reflux via line 8, while the remainder passes to column 13 via valved line 10, and line 11.

In case the other constituents in the feed boil at a temperature lower than that of components A and B, column 2 may be operated to take them overhead as described above for components A and B, withdrawing them via valved line 9. In this case A and B are withdrawn from the bottom of column 2 and pass to column 13 via valved line 12 and line 11.

In cases where both higher and lower boiling components A and B are present a series of prefractionation columns may be employed or a single column having a side stripper to withdraw an intermediate concentrate rich in A and B which may be passed to column 13 may be used.

The resulting feed mixture containing components A and B is fed via valved line 10 and line 11 to extractive distillation column 13 equipped with reboiler 14. As the distillation proceeds the aforementioned relatively high boiling selective solvent is admitted to column 13 via line 15, flowing down the column countercurrently contacting ascending vapors and selectively dissolving A.

Column 13 is operated for high recovery; that is, the heat input and reflux ratio are so regulated as to insure recovery of the bulk of A, by preventing the loss of less volatile component A to the top product (which incidentally would contaminate more volatile component B) and so that only pure B is taken overhead via line 16 while a small portion thereof is withdrawn along with A in the bottom product with solvent. The overhead vapors of pure B pass to condenser 17 and collect in accumulator 18 whence a portion is returned to column 13 as reflux via line 19, while the remainder passes via line 20 to storage not shown.

The bottom product of column 13 comprises solvent, the bulk of A and a minor portion of B, and passes via line 21 to column 22 equipped with reboiler 23, to which a further quantity of fresh solvent is admitted via line 24.

Column 22 is operated for purity of bottom product; that is, the heat input and reflux ratio are so regulated as to prevent contamination of the bottom A with more volatile component B. To insure this, a small portion of the less volatile component A is allowed to pass overhead via line 25 to condenser 26. Condensed vapors collect in accumulator 27 whence a portion may be returned to column 22 as reflux via line 28. The remainder is recycled to an appropriate level of column 2 or column 13. In case it is desired to recycle the overhead product to column 2 it passes via lines 29 and 34 and the manifold system including valves 35, 36 and 37, to column 2. In the latter case it passes via lines 29 and 30 and the manifold system involving valves 31, 32 and 33. The level at which the recycled mixture of A and B is introduced in column 2 or column 13 depends upon its composition. Thus, if the recycled material contains more A than the feed to column 2 or 13, it will be introduced at a level below the feed plate, while if it contains less A than the feed it will be introduced at a level above the feed plate. In other words, it is generally desirable to introduce the recycled material at that level where the composition of the material in the column is the same as the composition of the recycled material. The bottom product of column 22 comprising solvent and A substantially free of B passes via line 38 to stripping column 39 equipped with reboiler 40, to separate solvent from A. The recovered relatively high boiling lean solvent is recycled to column 13 via lines 41 and 15 and to column 22 via lines 41 and 24.

Vapors of pure component A pass overhead via line 42 to condenser 43. Condensed vapors collect in accumulator 44, whence a portion is returned to column 39 as reflux via line 45. The remainder of component A passes via line 46 to storage not shown.

The optimum distribution of solvent to columns 22 and 13 respectively depends in general upon several factors, the most important of which are the composition of the feed, relative difficulty in attaining the different separations in the different columns, and the purity required. Thus, in any given separation more, equal or lesser quantities of solvent may be recycled to columns 22 and 13. It is to be emphasized, however, that both extractive distillation columns 22 and 13 must receive sufficient quantities of solvent so that each distillation is carried out in the presence of an appreciable concentration of solvent.

In the above description various flow means, heat exchangers, pumps, valves and other auxiliary equipment, the proper placement of which is evident to those skilled in the art, have been omitted for simplicity.

Our invention is applicable to any extractive distillation where a mixture of components is distilled in the presence of a relatively high boiling solvent which alters the vapor pressure relationships. It is particularly applicable to separations in which close degree of control is required, as is likely in cases where a single chemical component is isolated from a complex mixture, such as the isolation of an aromatic hydrocarbon in pure form from mixed petroleum hydrocarbons, butadiene from cracked hydrocarbon mixtures, anhydrous acetic acid or acetone from their aqueous solutions, thiophenol from an alkyl phenol mixture, the dehydration of aqueous hydrochloric acid and the separation of chlorine from effluent gases of the Deacon process, etc. Suitable solvents for extractive distillation of different mixtures are well known in the art. Reference is had, for example, to U. S. Patents 1,882,978, 1,919,752, 1,948,777, 2,215,915, 1,795,977, 1,796,059 and 2,288,126.

We claim as our invention:

1. A process for separating a relatively narrow boiling range mixture comprising components A and B, component A having a relatively lower vapor pressure in the presence of a relatively high boiling selective solvent than component B, comprising the steps of distilling said mixture in a first distillation zone in the presence of said solvent under conditions to produce a first overhead vapor rich in B and leave a first bottom product comprising said solvent containing dissolved A and a minor portion of B, further distilling said first bottom product in a second distillation zone in the presence of a further added quantity of said solvent under conditions to produce a second overhead product comprising vapors of A and B and to leave a second bottom product comprising solvent rich in dissolved A, distilling said second bottom product in a third distillation zone to separate A from said solvent, returning at least a part of said recovered solvent to said first and second distillation zones, returning at least a part of said second overhead product to said first distillation zone, and introducing it at a level thereof where the composition of material in said zone is substantially the same as the composition of the returned material.

2. A process for separating a relatively narrow boiling range mixture comprising components A and B, component A having a relatively lower vapor pressure in the presence of a relatively high boiling selective solvent than component B, comprising the steps of distilling said mixture in a first distillation zone in the presence of said solvent under conditions to produce a first overhead vapor rich in B, condensing at least a portion of said overhead vapor and returning condensate to said first distillation zone as reflux, leaving a first bottom product comprising said solvent containing dissolved A and a minor portion of B, further distilling said first bottom product in a second distillation zone in the presence of a further added quantity of said solvent under conditions to produce a second overhead product comprising vapors of A and B and to leave a second bottom product comprising solvent rich in dissolved A, distilling said second bottom product to separate A from said solvent, returning at least a part of said recovered solvent to both aforementioned distillation zones and returning at least a part of said second overhead product to said first distillation zone at a level below the level at which said reflux is introduced to said first mentioned distillation zone.

3. A process for separating a mixture comprising components A and B, component A having a relatively lower vapor pressure in the presence of a relatively high boiling selective solvent than component B, comprising the steps of initially distilling said mixture in a first distillation zone to produce an overhead product and a fraction enriched with respect to components A and B, condensing at least a portion of said overhead product and returning condensate to said first distillation zone as reflux, further distilling said enriched fraction in the presence of said solvent in a second distillation zone under conditions to produce a second overhead vapor rich in B and to leave a first residual product comprising said solvent containing dissolved A and a minor portion of B, further distilling said residual product in a third distillation zone in the presence of a further added quantity of said solvent under conditions to produce a third overhead product comprising vapors of A and B and to leave a second residual product comprising solvent rich in dissolved A, distilling said second residual product to separate A from said solvent, returning at least a part of said recovered solvent to said second and third distillation zones, and returning at least a part of said third overhead product to said first distillation zone.

RUSSELL N. SHIRAS.
MOTT SOUDERS, Jr.